US010870359B2

(12) United States Patent
Chen

(10) Patent No.: US 10,870,359 B2
(45) Date of Patent: Dec. 22, 2020

(54) AUTO-BALANCING VEHICLE WITH INDEPENDENT WHEEL CONTROL

(71) Applicant: Shane Chen, Camas, WA (US)

(72) Inventor: Shane Chen, Camas, WA (US)

( * ) Notice: Subject to any disclaimer, the term of this patent is extended or adjusted under 35 U.S.C. 154(b) by 93 days.

(21) Appl. No.: 15/902,380

(22) Filed: Feb. 22, 2018

(65) Prior Publication Data

US 2018/0257512 A1    Sep. 13, 2018

Related U.S. Application Data

(60) Provisional application No. 62/469,117, filed on Mar. 9, 2017.

(51) Int. Cl.
| | | |
|---|---|---|
| *B60L 15/20* | (2006.01) | |
| *B62K 11/00* | (2006.01) | |
| *B62K 15/00* | (2006.01) | |
| *B62J 25/00* | (2020.01) | |

(52) U.S. Cl.
CPC ........ *B60L 15/2036* (2013.01); *B62K 11/007* (2016.11); *B60L 2200/16* (2013.01); *B60L 2220/42* (2013.01); *B60L 2220/44* (2013.01); *B60L 2220/46* (2013.01); *B60L 2240/16* (2013.01); *B60L 2240/20* (2013.01); *B60L 2240/461* (2013.01); *B62J 25/00* (2013.01); *B62K 2015/003* (2013.01); *Y02T 10/64* (2013.01); *Y02T 10/72* (2013.01)

(58) Field of Classification Search
CPC ............ B60L 15/2036; B60L 2200/16; B60L 2220/46; B60L 2220/44; B62K 1/00; B62K 11/007; B62K 15/006; B62K 15/008; B62K 2015/001; B62K 2015/003; B62K 2015/2036; B60C 23/007
See application file for complete search history.

(56) References Cited

U.S. PATENT DOCUMENTS

| | | | |
|---|---|---|---|
| 6,302,230 B1 | 10/2001 | Kamen | |
| 8,225,891 B2 * | 7/2012 | Takenaka | ............. B62K 11/007 180/7.1 |
| 8,684,123 B2 * | 4/2014 | Chen | .................... B62K 11/007 180/218 |
| 8,738,278 B2 | 5/2014 | Chen | |
| 8,807,250 B2 | 8/2014 | Chen | |
| 9,045,190 B2 * | 6/2015 | Chen | ................. A63C 17/0073 |
| 10,059,397 B2 * | 8/2018 | Zheng | .................... B62K 3/002 |
| 10,286,974 B2 * | 5/2019 | Yang | ........................ B60K 1/02 |
| 2008/0147281 A1 * | 6/2008 | Ishii | ..................... B62D 51/005 701/49 |
| 2010/0025139 A1 * | 2/2010 | Kosaka | .................. B62D 61/00 180/218 |

(Continued)

*Primary Examiner* — Ruth Ilan
*Assistant Examiner* — Maurice L Williams
(74) *Attorney, Agent, or Firm* — Steven J. Sullivan

(57) ABSTRACT

An auto-balancing transportation device having first and second wheels that are independently drivable. The device includes foot platforms, a control circuit and sensors. Device control is preferably achieved through the position or weight distribution of a rider's feet. The wheels may be arranged in parallel or non-parallel and the foot platforms may be located on the interior are exterior side of the wheels. The wheels may be coupled to one another in a manner that affords tilting, thereby increasing stability when executing a turn, among other benefits. Various embodiments and features are disclosed.

19 Claims, 9 Drawing Sheets

(56) References Cited

U.S. PATENT DOCUMENTS

| | | | |
|---|---|---|---|
| 2011/0068738 A1* | 3/2011 | Gomi | B62J 1/005 320/108 |
| 2011/0221160 A1* | 9/2011 | Shaw | B60L 7/12 280/205 |
| 2012/0018239 A1* | 1/2012 | Britt | B62M 3/08 180/206.4 |
| 2013/0032423 A1* | 2/2013 | Chen | A63C 17/0073 180/218 |
| 2013/0238231 A1* | 9/2013 | Chen | B62K 11/007 701/124 |
| 2015/0353158 A1* | 12/2015 | Chang | B62K 3/002 180/6.5 |
| 2016/0129937 A1* | 5/2016 | Suzuki | B60G 3/145 180/65.51 |
| 2017/0106931 A1* | 4/2017 | Wood | B62K 11/007 |
| 2017/0217526 A1* | 8/2017 | Zhang | B60K 7/0007 |
| 2017/0369118 A1* | 12/2017 | Dai | B62K 3/002 |
| 2018/0029662 A1* | 2/2018 | Acciardi | B62K 11/007 |
| 2018/0127048 A1* | 5/2018 | Li | B62K 11/007 |
| 2018/0148121 A1* | 5/2018 | Ying | B62K 11/007 |

\* cited by examiner

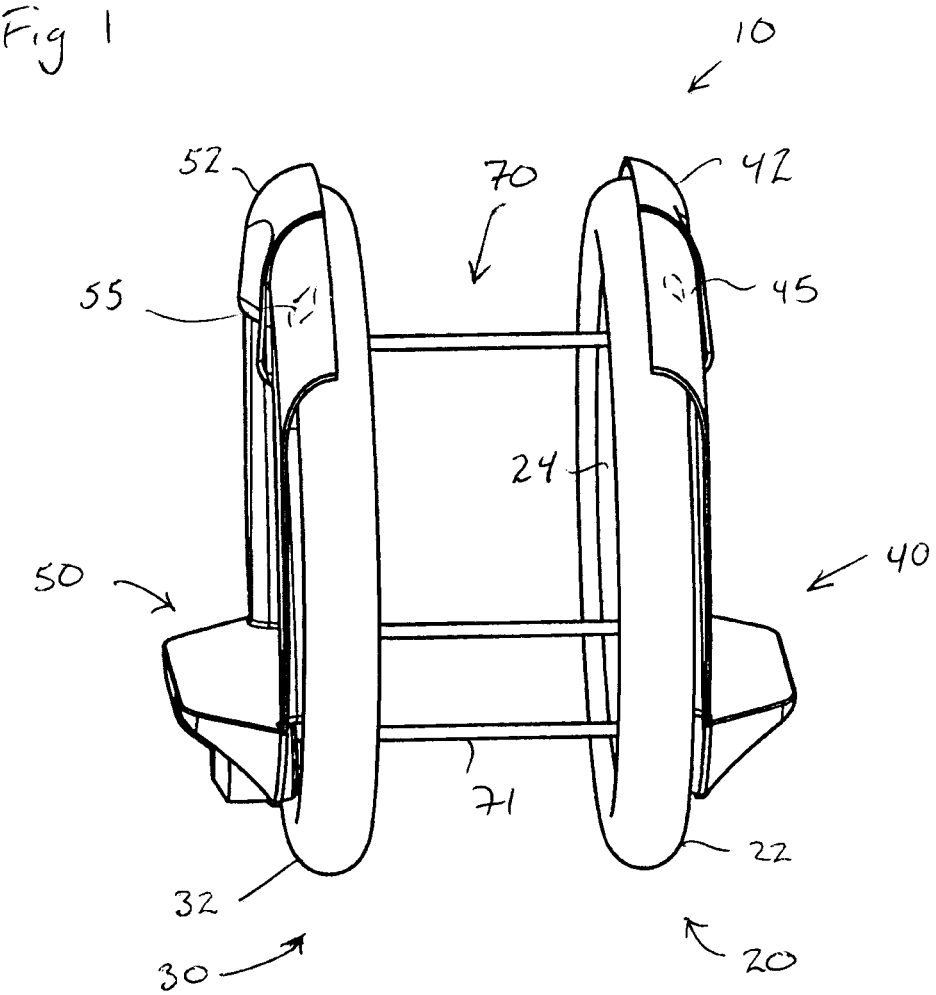

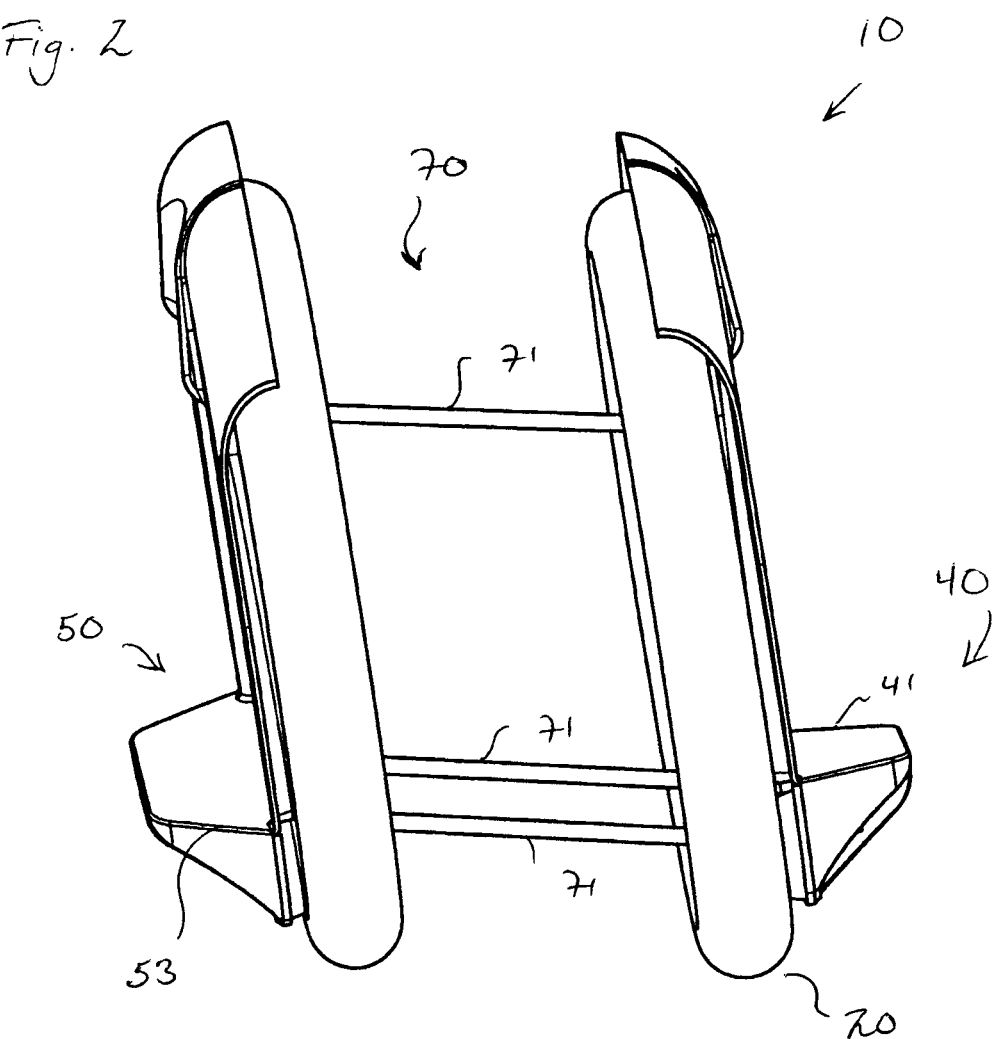

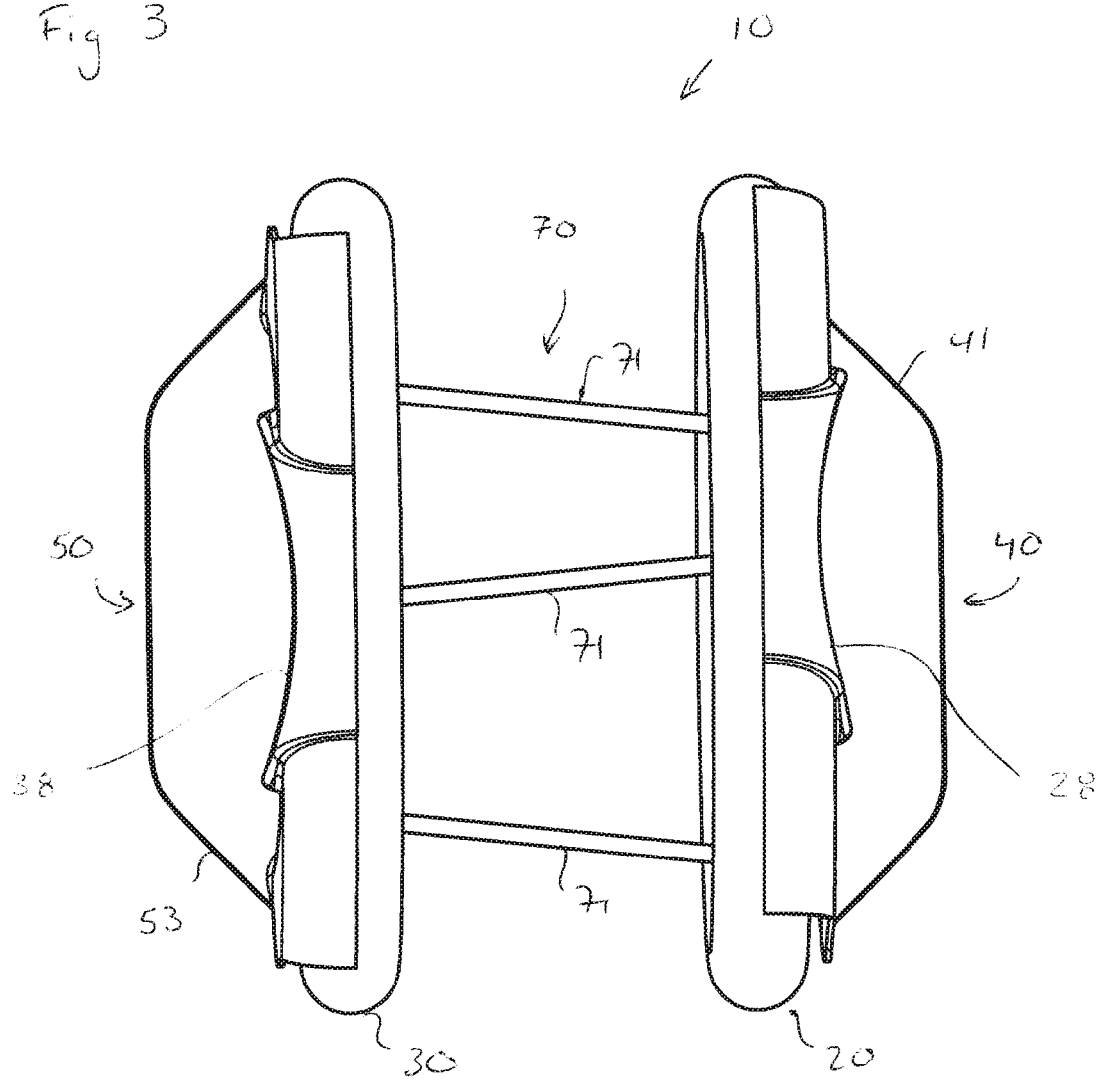

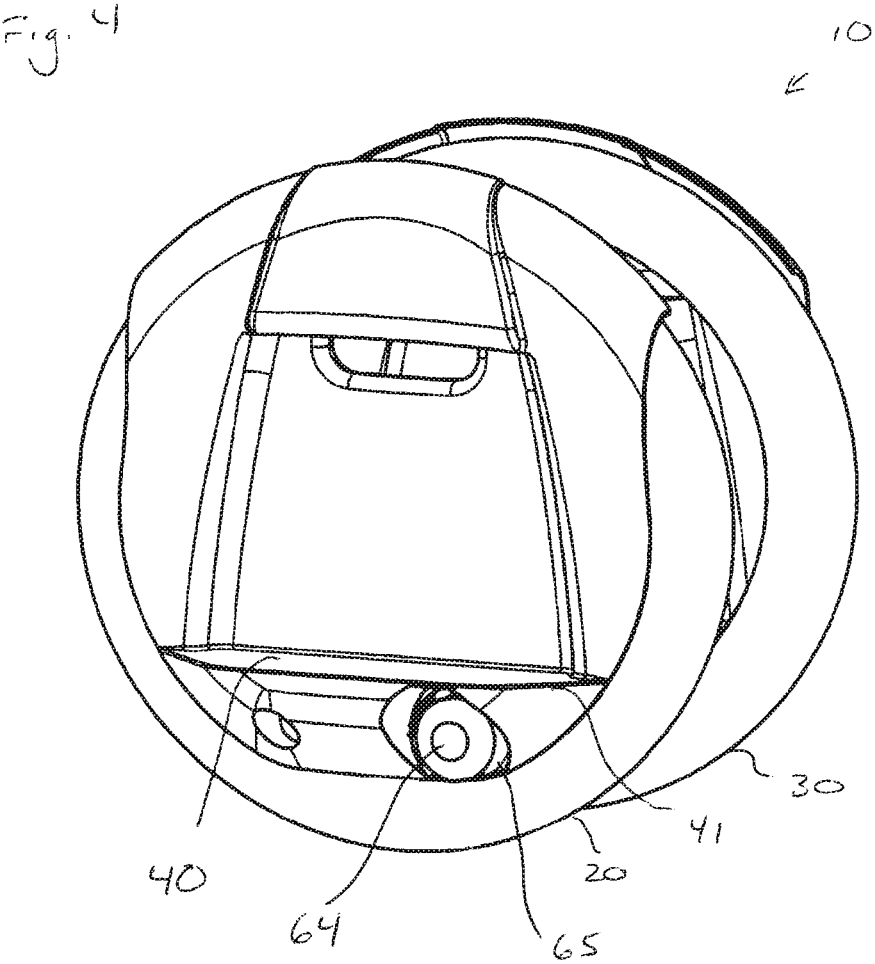

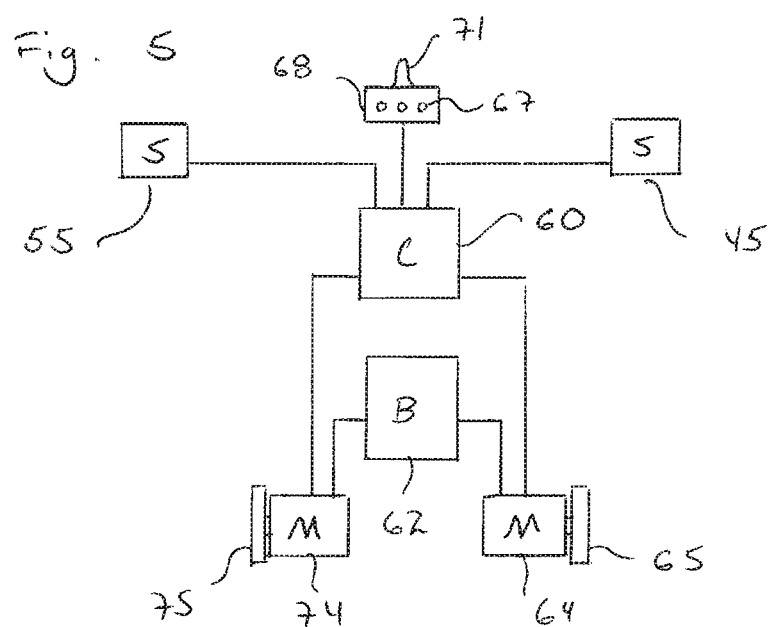
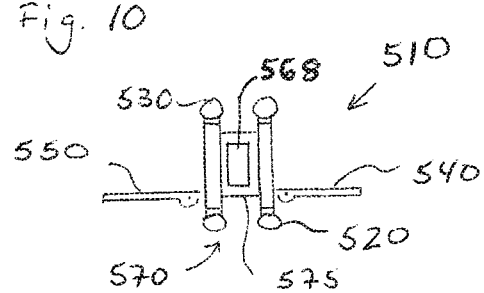

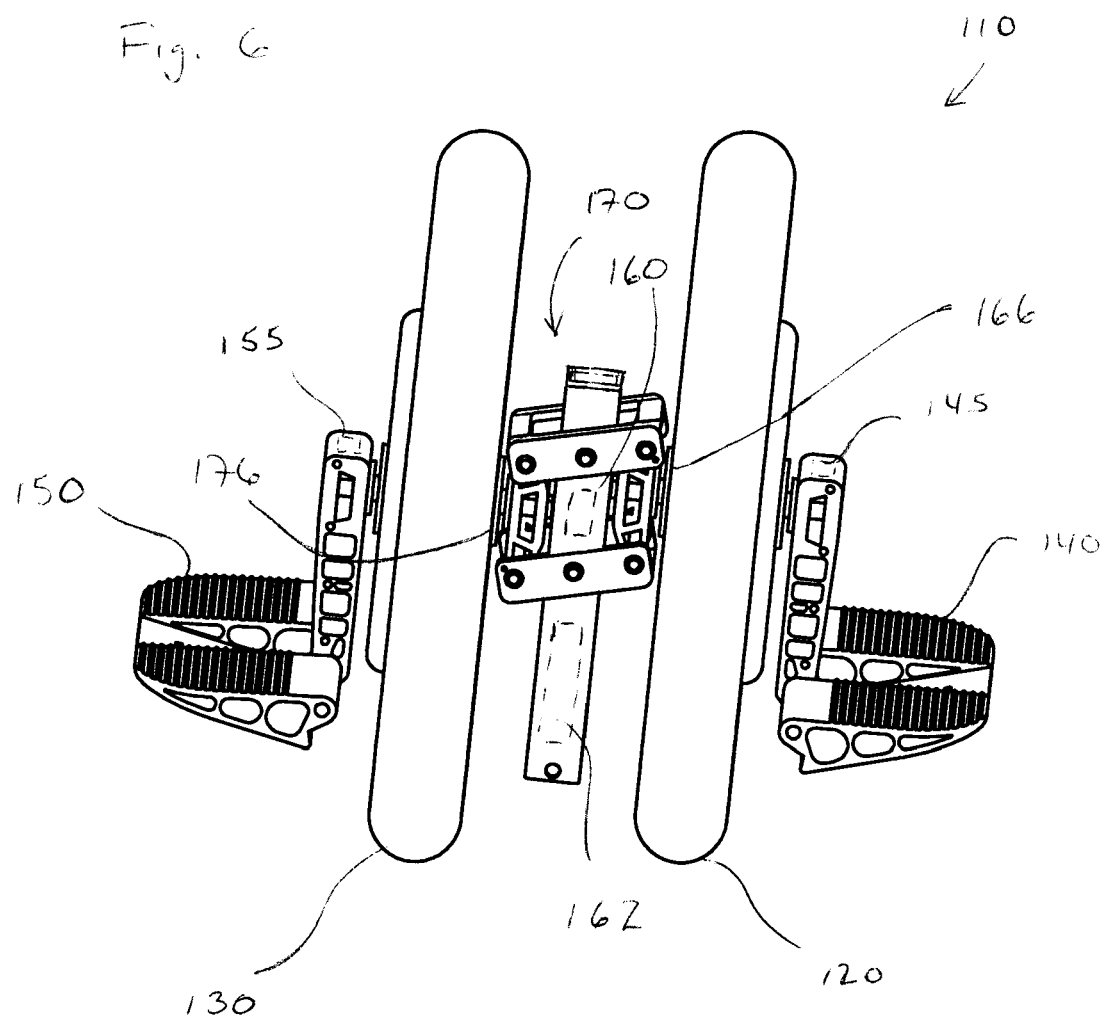

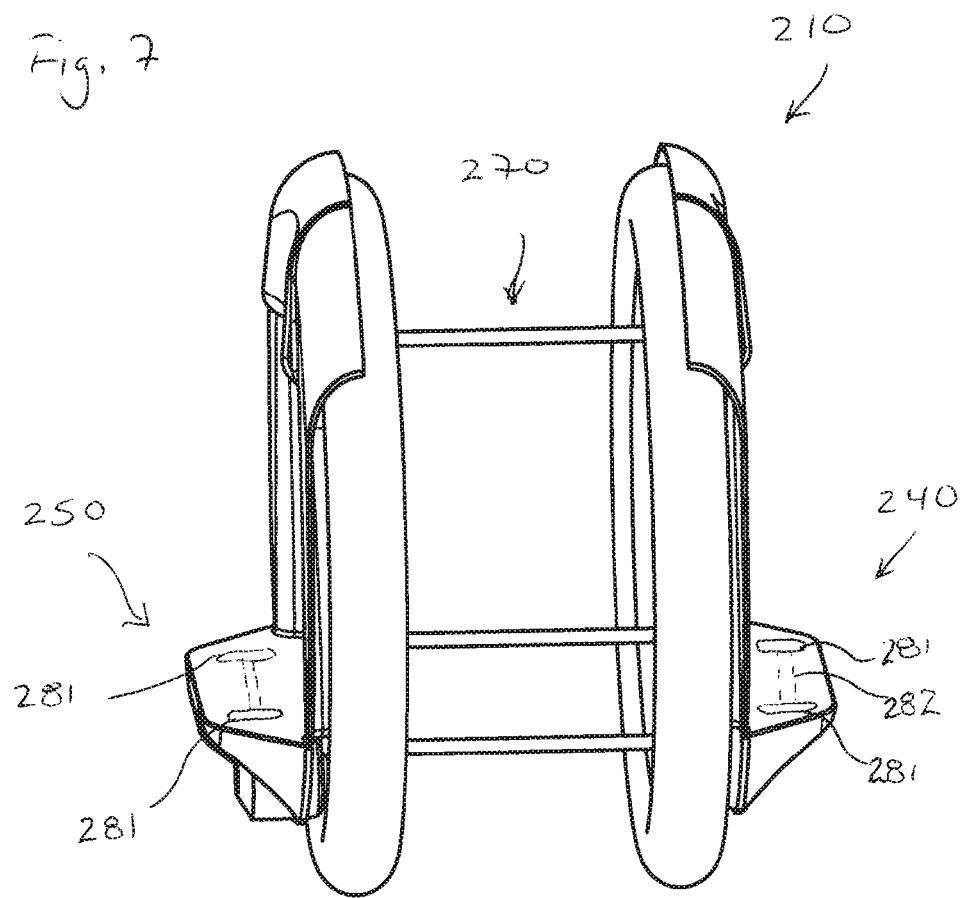

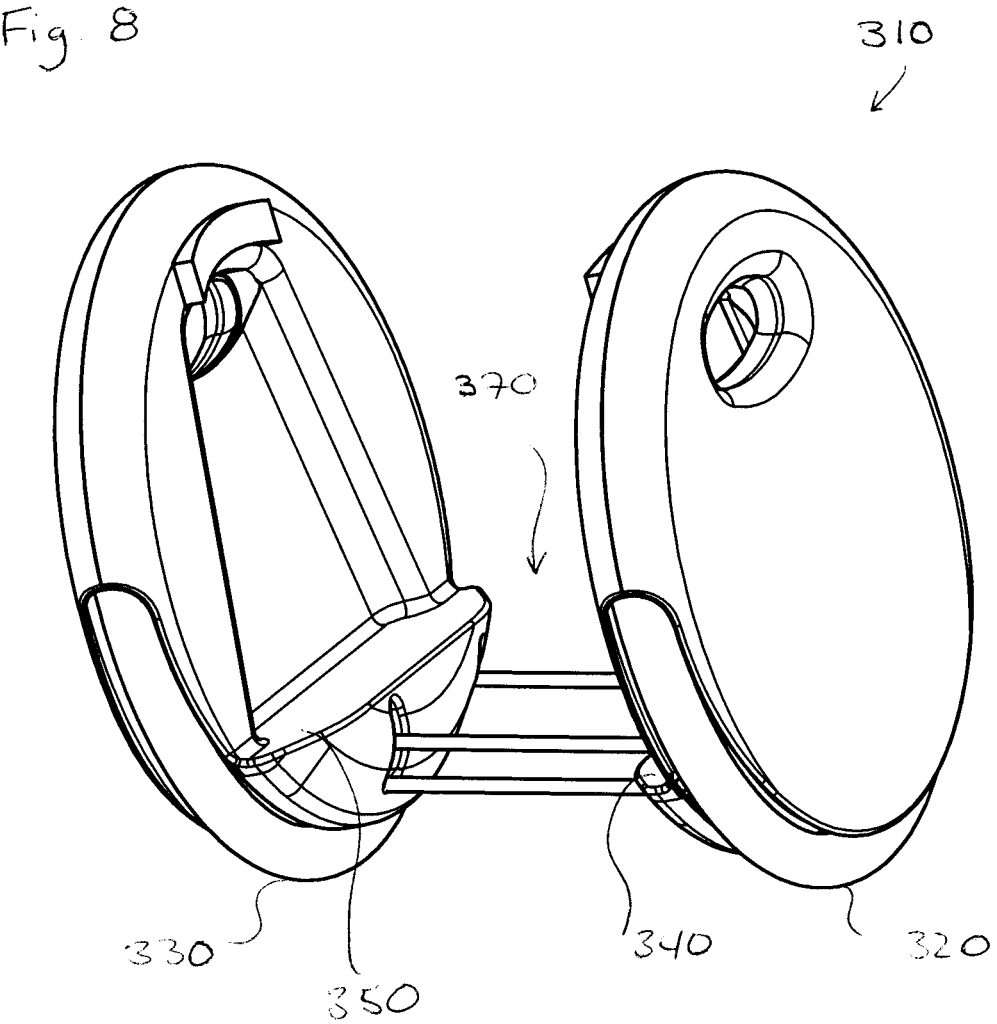

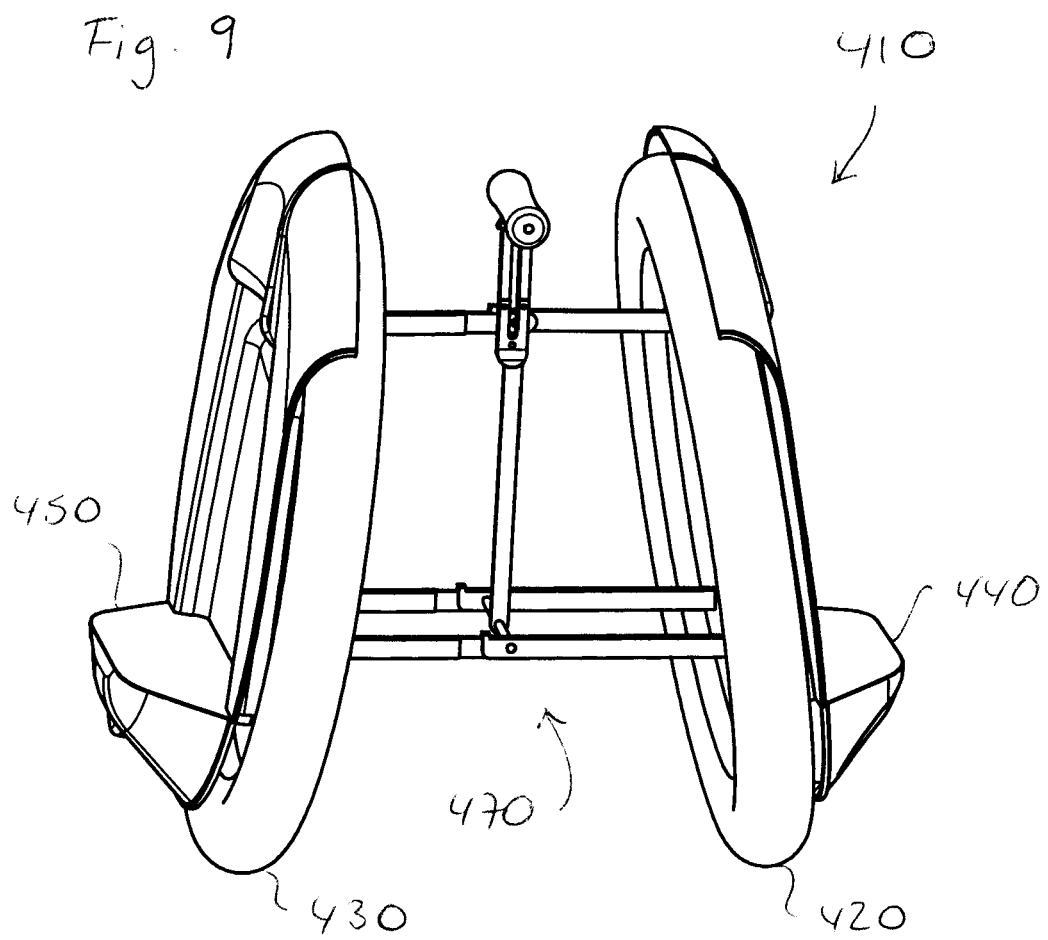

AUTO-BALANCING VEHICLE WITH INDEPENDENT WHEEL CONTROL

CROSS REFERENCE TO RELATED APPLICATIONS

This application claims the benefit of U.S. Provisional Application No. 62/469,117, filed Mar. 9, 2017, entitled Self-Balancing Vehicle with Tiltable Wheels and Independent Wheel Control, by the inventor above.

FIELD OF THE INVENTION

The present invention relates to self-balancing transportation devices and, more specifically, to such devices with independently movable foot platforms.

BACKGROUND OF THE INVENTION

The prior art includes various fore-aft self-balancing vehicles. These include the Segway (disclosed in U.S. Pat. No. 6,302,230, among others), the Gyrotrax (disclosed in U.S. Pat. No. 8,684,123, among others), the Hovertrax, referred to commonly as a "hoverboard" (disclosed in U.S. Pat. No. 8,738,278), and the Solowheel (disclosed in U.S. Pat. No. 8,807,250). These devices contribute to the art of fore-aft self-balancing vehicles and the above-mentioned patents are hereby incorporated by reference as though disclosed herein.

Among other embodiments, U.S. Pat. No. 8,684,123 (the '123 patent) discloses a self-balancing device having two parallel wheels that are configured to be tiltable from side-to-side while maintaining their parallel arrangement (see, for example, FIGS. 8-16 of the '123 patent). A gyroscopic sensor is provided that detects fore-aft pitch and side-to-side tilt. Fore-aft pitch may be used for velocity and direction (forward/backward), while side-to-side lean may be used for turning (driving wheels at different speeds) and safety (slowing during a turn), etc. This structure provides several benefits including increased stability (two wheels, foot platforms remaining close to ground during turn, etc.), an intuitive feel, potentially more lower leg contact (depending on configuration, for example, compared to Hovertrax), a more narrow wheel base (compared to Hovertrak), and a closer approximation to skiing, etc.

In this embodiment (FIGS. 8-16 of the '123 patent), the wheels and associated foot platforms are coupled through a parallelogram structure that achieves side-to-side tilt while maintaining a parallel relationship. This parallelogram structure, however, does not permit the foot platforms to move (i.e., rotate) fore-aft relative to one another and thus there is no independent control or drive of the wheels based on independent positioning (i.e., fore-aft rotation or pitch) of the foot platforms. Failure to provide this independent foot platform positioning limits the control a user may exert of the device and the ease, responsiveness and enjoyment of the rider experience. For example, independent movement would allow a rider tighter turns and to "spin" in place, among other benefits.

Thus, a need exists for a two-wheel auto-balancing vehicle that affords independent drive or control of the wheels. A need also exists for such a device in which the wheels, whether arranged in parallel or not, are capable of tilting, particularly during a turn. Wheel tilting, or another mechanism that facilitates contact of both wheels with the ground during a turn, enhances stability.

SUMMARY OF THE INVENTION

It is an object of the present invention to provide an auto-balancing transportation device that overcomes the shortcomings of the prior art.

It is another object of the present invention to provide an auto-balancing transportation device that affords independent wheel control.

It is yet another object of the present invention to provide an auto-balancing transportation device with independent wheel control that allows sideways tilting of the wheels, for example, during a turn.

These and related objects of the present invention are achieved by use of personal transportation device as described herein.

The attainment of the foregoing and related advantages and features of the invention should be more readily apparent to those skilled in the art, after review of the following more detailed description of the invention taken together with the drawings.

BRIEF DESCRIPTION OF THE DRAWINGS

FIG. 1 is a perspective view of one embodiment of a two wheel self-balancing transportation device in accordance with the present invention.

FIGS. 2-3 are perspective views of the embodiment of FIG. 1 with the foot platforms moved relative to one another.

FIG. 4 is a partial cut-away view of the device of FIG. 1 illustrating one embodiment of a drive assembly.

FIG. 5 is a block diagram of control components for the device of FIG. 1.

FIG. 6 is a perspective view of another embodiment of a two wheel self-balancing transportation device in accordance with the present invention.

FIGS. 7-9 are perspective views of other embodiments of a two wheel self-balancing transportation device in accordance with the present invention.

FIG. 10 is a cut-away front elevation view of yet another auto-balancing transportation device in accordance with the present invention.

DETAILED DESCRIPTION

Referring to FIG. 1, a perspective view of one embodiment of a two wheel self-balancing transportation device 10 in accordance with the present invention is shown. Device 10 may include first and second wheels 20,30 that each have a tire 22,32, respectively. These wheels may be mounted for rotatable movement about a wheel frame or support 24,34 (support 34 is obscured by wheel 30). The wheels preferably include a tire and a rim.

A foot platform 40,50 is associated with each wheel 20,30, respectively. A housing 42,52 may cover portions of the wheel and house a drive motor, battery and other components of device 10. A position sensor 45,55, preferably a gyroscopic sensor, is provided for each foot platform. The position sensor may be located on or off its associated foot platform, yet is preferably arranged to detect a fore-aft pitch of its platform. In FIG. 1, the sensors are shown higher up on the housings, though they may be located lower on the housing, on or near the foot platforms, or elsewhere. The sensors preferably detect fore-aft pitch and may also detect side-to-side tilt, among other measures. While one gyroscopic sensor is suitable for fore-aft and tilt measures, separate sensors may be used.

An electronic control circuit 60 (see FIG. 5) is preferably coupled to position sensors 45,55 and drive motors 64,74. This circuit generates control signals to the motors to drive wheels 20,30 towards auto-balancing the device (i.e., driving toward "balancing" a tilted platform) based on data from the associated sensor 45,55. The control circuit may be provided at any suitable location within device 10. Fore-aft (i.e., pitch) based auto-balancing and the components and techniques therefor are known in the art.

In one embodiment of a structure for coupling wheels 20,30 to one another, a connecting structure 70 is provided that may include three rods or shafts 71 coupled to and between frames 24 and 34. The rods 71 may be made of a strong yet flexible material such as certain metals or alloys thereof or plastics or the like. The rods are preferably sufficiently flexible that a user may rotate one foot platform fore or aft relative to the other platform. The rods (and/or their connection to plates 24,34) are also preferably configured such that the two wheels 20,30 may tilt from side-to-side while maintaining a substantially parallel relationship. This may be achieved through the flexible material of the rods or a pivoting connection or a combination of these (flexible unidirectionally and pivoting in another), or other.

Referring to FIG. 2-4, three perspective views of device 10 of FIG. 1 are shown. FIG. 2 illustrates device 10 in which weight is applied unequally on the foot platforms 40,50 such that they have rotated with respect to one another. If FIG. 2 is a rear view, then a rider has applied more weight on the front end 41 of platform 40, pitching platform 40 forward and hence driving associated wheel 20 forward. If the position of platform 50 stays neutral (i.e., 0 pitch angle), then the forward pitch of platform 40 will cause the device to essentially rotate around a pivot point through wheel 30.

If platform 50 is pitched rearward while platform 40 is pitched forward, device 10 will turn more quickly with the wheels rotating in opposite directions. If the amount of forward pitch on one platform matches the amount of rearward pitch on the other platform, then the device will spin in place.

FIG. 3 is a top plan view of the arrangement of FIG. 2. The movement of rods 71 due to fore-aft rotation of the foot platforms relative to one another can be seen. The difference in relative position of the foot platforms 40,50 is shown, as is that of the optional leg guides or contact surfaces 28,38.

FIG. 4 is a partial cut-away view illustrating a drive motor 64 and a friction drive wheel 65. Motor 64 may be housed under foot platform 40 for wheel 20. A similar motor and drive wheel may be provided for wheel 50. Friction drive, hub motors, and other suitable motors/drive mechanisms are known in the art and may be used in herein.

FIG. 5 is a block diagram indicating component for control and drive of a wheel 20,30. This may include sensors 45,55, electronic control circuit 60, battery 62, motors 64,74, and drive wheels 65,75. Rider signal and/or communication componentry 68 may also be provided. Communication componentry 68 may include pathway or status indication lighting 67, and/or an antenna 71 for wireless communication to a user worn or carried device (phone, watch, other mobile device), etc. Suitable auto-balancing components and processing is known in the art.

In use, each wheel may have its own control components and operate independently. Alternatively, there may be one electronic control 60 (as shown in FIG. 5) coupled to both sensors and drive motors that drives the two wheels as appropriate. Further, side-to-side tilt may be sensed and used to influence speed and turning. For example, at low speed, for example 2-3 mph or less, or when spinning, independent foot control may work well. At higher speeds, for example, 2-3 mph and above, it may be better and safer, particularly for less experienced riders that the degree of independent foot control is reduced so that abrupt turns do not occur at higher speeds, potentially throwing a rider. A device slow down and/or less abrupt turn may be implemented.

Referring to FIG. 6, a perspective view of another embodiment of a two wheel self-balancing transportation device 110 in accordance with the present invention is shown. Device 110 is similar to device 10 in many ways and may include wheels 120,130, foot platforms 140,150, position sensors 145,155, a control circuit 160 and battery 162, and a linkage structure 170.

One different is that the linkage structure 170 is preferably comprised of longitudinal and lateral support members formed in a parallelogram-like arrangement. This arrangement allows tilting of the wheel from side to side, yet maintains their relative spacing.

Independent platform movement may be achieved in several ways. In one embodiment, the linkage structure is flexible in one dimension (fore-aft) so that the platforms may rotate in fore-aft relative to one another. The structural members are substantial rigid in the other dimension to maintain the parallel relationship while tilting.

In another embodiment, the individual members of the linkage structure are substantially rigid (i.e., not flexible) yet structure 170 is mounted to plates 166 and 176 that are coupled to wheels 120 and 130, respectively, in a manner that support rotational movement of the foot platforms in fore-aft.

Referring to FIG. 7, yet another embodiment of a two wheel self-balancing transportation device 210 in accordance with the present invention is shown.

Device 210 is similar in some aspects to the embodiments discussed above. For example, device 210 preferably has a linkage structure 270 that permits side-to-side tilt of the wheels while both wheels remain on the ground. The shafts in the coupling structure may be pivotally connected to the wheel supports, perhaps with a bias mechanism that biases them towards a straight up default position, or be otherwise configured as discussed herein.

Device 210 provides pressure sensors 281 on each platform. At least two sensors are preferably provided on each platform (front-back) for detecting a fore-aft weight distribution. Alternatively, or in addition to, a longitudinal pressure sensor 282 may be provided that senses weight distribution along (or at various points along) its length. These pressure sensors provide the fore-aft inputs for independent wheel control as discussed herein.

Device 210 may also include an infrared sensor, proximity sensor or light beam foot detector sensor.

Referring to FIG. 8, a perspective view of an auto-balancing transportation device 310 in accordance with the present invention is shown. Device 310 is similar to other devices herein yet the foot platforms 340,350 are on the inside of their respective wheels 320,330, as opposed to the outside. Coupling structure 370 includes rods or shafts that couple the two wheels and allow both tilting and rotational movement of the platforms in fore-aft (or the presence of weight sensors or the like for independent wheel driving) as discussed above.

Referring to FIG. 9, a perspective view of an auto-balancing transportation device 410 in accordance with the present invention is shown. Device 410 is similar to other devices herein, yet one difference is that the wheels 420,430 are arranged in a non-parallel position. The coupling structure 470 is preferably configured as discussed elsewhere herein, to allow tilting of the wheels relative to one another while maintaining a known spacing. Independent wheel driving can be achieved by coupling structure 470 affording rotational movement of the foot platforms 440,450 or pressure sensors or the like.

Referring to FIG. 10, a cut-away front elevation view of yet another auto-balancing transportation device 510 in accordance with the present invention is shown. Device 510 may be similar to other devices discussed herein, yet has a different coupling structure 570. In device 510, the structure 570 that couples the wheels 520,530 to one another may include a frame or block or the like 575 that is sufficiently sturdy to maintain the wheels in a substantially parallel relationship, yet flexible or movable enough, particularly in fore-aft, to afford movement of the platforms 540,550 in a fore-aft rotational sense (to drive the wheels). A torsion sensor 568 may be coupled to frame 575 to detect the relative movement or displacement of the frame and hence the foot platforms. Frame 575 may be made of rubber, pliable metals, durable flexible plastic, a combination of these materials, or other materials.

In one embodiment of device 510, only one fore-aft pitch position sensor is needed and it may be on a platform or elsewhere (e.g., on the coupling structure 570 or housing or other). The position sensor could yield a base speed and direction and the torsion sensor could yield an adjustment to that base drive signal due to the relative position of the two foot platforms (as determined by the torsion sensor).

While two position sensors are shown or described for many of the above devices, it should be recognized that the device may be made to function with one position sensor plus a relative position sensor that could sense the position of one platform relative to the other.

It should also be noted that the amount of fore-aft rotational movement of the foot platforms may be +/−5 degrees, or +/−10 degrees, or +/−20 degrees or the like, from true vertical, to achieve sufficient relative movement to independently drive the wheels (and have a "good" feel to a rider). For rider comfort, +/−5 to 10+/− degrees may be preferred, though +/−20 degrees or more may be used without departing from the present invention.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. An auto-balancing transportation device comprising:
   a first wheel, a first foot platform associated with the first wheel, a first sensor, and a first drive motor that drives the first wheel;
   a second wheel, a second foot platform associated with the second wheel, a second sensor, and a second drive motor that drives the second wheel;
   a control circuit that drives the first drive motor towards auto-balancing the first foot platform based on data from the first sensor and that drives the second drive motor towards auto-balancing the second foot platform based on data from the second sensor; and
   a coupling structure that couples the first wheel to the second wheel in such a manner that the first and second foot platforms rotate in fore-aft relative to one another;
   wherein the first foot platform is located laterally exterior of the first wheel and the second foot platform is located laterally exterior of the second wheel, such that the first and second wheels are centrally located and the first and second foot platforms are distally located;
   wherein the coupling structure affords lateral tilting of the first and second wheels while the first and second wheels each maintain contact with a horizontal surface; and
   wherein the coupling structure includes support members coupled between the first and second wheels that are sufficiently flexible to afford fore-aft rotational movement of the foot platforms relative to one another.

2. The device of claim 1, wherein at least one of the first and second sensors is a position sensor.

3. The device of claim 2, wherein the first sensor is a fore-aft position sensor associated with the first foot platform and the second sensor is a fore-aft position sensor associated with the second foot platform.

4. The device of claim 1, wherein at least one of the first and second sensors is a pressure sensor.

5. The device of claim 1, wherein at least one of the first and second sensors is a torsion sensor.

6. The device of claim 1, wherein the coupling structure includes support members that couple to each wheel in a manner that affords fore-aft pivotal movement of the first and second foot platforms relative to one another.

7. The device of claim 6, wherein the coupling structure include support members that are sufficiently flexible to allow lateral tilting of the wheels during use.

8. The device of claim 1, wherein the coupling structure affords fore-aft rotational movement of the first and second foot platforms +/−20 degrees or less from vertical.

9. The device of claim 1, wherein the coupling structure affords fore-aft rotational movement of the first and second foot platforms +/−10 degrees or less from vertical.

10. An auto-balancing transportation device comprising:
    a first wheel, a first foot platform associated with the first wheel, a first drive motor that drives the first wheel, and a first sensor associated with the first foot platform;
    a second wheel, a second foot platform associated with the second wheel, a second drive motor that drives the second wheel, and a second sensor associated with the second foot platform;
    a control circuit that drives the first drive motor towards auto-balancing the first foot platform based on data from the first sensor and that drives the second drive motor towards auto-balancing the second foot platform based on data from the second sensor; and
    a coupling structure that couples the first wheel to the second wheel in such a manner that the first and second foot platforms rotate in fore-aft relative to one another;
    wherein the first and second wheels are capable of being driven in opposite directions;
    wherein the coupling structure affords lateral tilting of the first and second wheels during use, and is configured such that during a lateral tilt on a horizontal surface the axis of rotation of the first wheel is non-collinear with the axis of rotation of the second wheel; and
    wherein the coupling structure includes support members coupled between the first and second wheels that are sufficiently flexible to afford fore-aft rotational movement of the foot platforms relative to one another.

11. The device of claim 10, wherein the first and second foot platforms are respectively located on a lateral exterior side of the first and second wheels.

12. The device of claim 10, wherein in the absence of a lateral tilt and on a horizontal surface the axes of rotation of the first and second wheels are collinear.

13. The device of claim 10, wherein the first and second sensors include at least one of the group of sensors including a position sensor and a pressure sensor.

14. The device of claim 10, wherein the first and second wheels are maintained substantially in parallel, in the absence or presence of a lateral tilt.

15. An auto-balancing transportation device comprising:
a first wheel, a first foot platform associated with the first wheel, a first sensor, and a first drive motor that drives the first wheel;
a second wheel, a second foot platform associated with the second wheel, a second sensor, and a second drive motor that drives the second wheel;
a control circuit that drives the first drive motor towards auto-balancing the first foot platform based on data from the first sensor and that drives the second drive motor towards auto-balancing the second foot platform based on data from the second sensor; and
a coupling structure that couples the first wheel to the second wheel, the coupling structure affording fore-aft rotational movement of the first and second foot platforms relative to one another;
wherein the first foot platform is located laterally exterior of the first wheel and the second foot platform is located laterally exterior of the second wheel;
wherein the coupling structure affords lateral tilting of the first and second wheel during use, and is configured such that during a lateral tilt on a horizontal surface the axis of rotation of the first wheel is non-collinear with the axis of rotation of the second wheel; and
wherein at least one of the first and second sensors is a torsion sensor.

16. The device of claim 15, wherein the first and second wheels are capable of being driven in opposite directions.

17. The device of claim 15, wherein the other of the first and second sensors is a position sensor.

18. The device of claim 15, wherein the coupling structure includes support members that couple to each wheel in a manner that affords fore-aft pivotal movement of the first and second foot platforms relative to one another.

19. The device of claim 15, wherein the coupling structure includes support members coupled between the first and second wheels that are sufficiently flexible to afford fore-aft rotational movement of the foot platforms relative to one another.

* * * * *